C. P. HAUGHIAN.
METALLIC PLATES COMPOUNDED OF STEEL AND IRON.
No. 183,161. Patented Oct. 10, 1876.
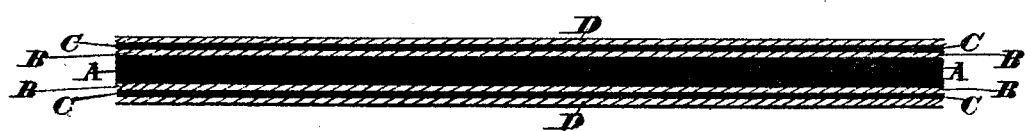
WITNESSES
INVENTOR
Charles P Haughian
By Knight Bro Attorneys
JAMES R. OSGOOD & CO. BOSTON.

UNITED STATES PATENT OFFICE.

CHARLES P. HAUGHIAN, OF BROOKLYN, NEW YORK, ASSIGNOR TO WILLIAM ARTHUR, IN TRUST FOR WILLIAM ARTHUR, CHARLES P. HAUGHIAN, CASPER D. SCHUBARTH, AND JULIUS BAUR, OF SAME PLACE, AND ALFRED B. MULLETT, OF WASHINGTON, DISTRICT OF COLUMBIA.

IMPROVEMENT IN METALLIC PLATES COMPOUNDED OF STEEL AND IRON.

Specification forming part of Letters Patent No. 183,161, dated October 10, 1876; application filed December 18, 1875.

*To all whom it may concern:*

Be it known that I, CHARLES P. HAUGHIAN, of Brooklyn, in the county of Kings and State of New York, have invented certain new and useful Improvements in Protected Steel Plates, for use in the manufacture of burglar-proof safes and for other analogous purposes; and I do hereby declare that the following is a correct description of the invention.

My invention consists in constructing a plate of steel, using preferably chrome-steel, protected by alternate laminæ of wrought-iron and steel, welded to either face of the said steel body, to protect it from fracture or other injury.

The body of steel is of sufficient thickness to prevent the possibility of drawing the temper with a blow-pipe, and the facings of alternate laminæ of iron and steel are for the purpose of preventing fracture by the hammer.

In the accompanying drawing is a sectional view of a compound metallic plate illustrating the invention.

A represents the main body of the plate, consisting of steel—preferably chrome-steel. B B are layers of wrought-iron, of less thickness, applied to the faces of the plate. C represents an additional layer of steel applied over the iron B, and D an additional layer of wrought-iron. These alternate layers of iron and steel, as a protecting casing or facing to the steel body A, may be applied to any desirable number or extent.

In carrying out my invention, I take a plate, A, of any necessary size, of chrome-steel or other steel, and apply to one or both faces thereof the layers of iron B, with additional layers of steel and iron, and, having secured the whole together in a suitable pile, I place the said pile in a heating-furnace of any common or proper construction, and retain it there till it reaches a uniform welding-heat. It is then removed from the furnace in a cohesive state, and passed between rolls or placed beneath a hammer or other suitable device, by which the parts are inseparably welded together, and, if desirable, worked into the required shape at the same operation. The compound plate is then ready for use in the manufacture of burglar-proof safes, or for other analogous purposes, the body of steel being secured against the action of any tool for boring or cutting, while the external laminæ of iron or iron and steel effectively protect the body against fracture.

I am aware that plates and bars composed of alternate layers of iron and steel welded together are commonly used for various purposes. This, therefore, I do not claim.

My manufacture differs from others in two important respects: First, it consists of a main and comparatively thick body of steel, to impart the quality of impenetrability to the structure, with thin laminæ of iron on one or both faces, to protect it from fracture; second, the said body is made of chrome-steel, which I have found, by experiment, to possess peculiar value in the freedom with which it will unite with iron by welding.

The laminæ C are made of a fine and tough grade of steel, giving it the requisite tenacity. In all cases the interior body A, which, in practice, constitutes the main thickness of the plate, is of a grade of steel so hard as to be absolutely impervious to a drill, unless the temper is drawn, and this is prevented by the thickness of said steel plate.

Having thus described my invention, the following is what I claim and desire to secure by Letters Patent:

The combination of the internal body of steel A and a protecting casing consisting of alternate layers B C D, of iron and steel, as and for the purpose set forth.

C. P. HAUGHIAN.

Witnesses:
    A. B. MULLETT,
    C. D. SCHUBARTH.